United States Patent [19]
Pinard

[11] Patent Number: 5,949,873
[45] Date of Patent: Sep. 7, 1999

[54] METHOD OF PROVIDING CENTREX TYPE OPERATION USING A PBX AND A CENTRAL SWITCHING OFFICE

[75] Inventor: Deborah L. Pinard, Kanata, Canada

[73] Assignee: Mitel Corporation, Kanata, Canada

[21] Appl. No.: 08/833,426

[22] Filed: Apr. 7, 1997

[51] Int. Cl.⁶ .............................. H04M 7/00; H04M 3/42; H04M 3/00

[52] U.S. Cl. .................... 379/234; 379/201; 379/229; 379/243; 379/246; 379/251

[58] Field of Search ..................... 379/201, 207, 379/216, 219, 220, 221, 229, 233, 234, 242, 243, 245, 246, 251, 231

[56] References Cited

U.S. PATENT DOCUMENTS

| | | | |
|---|---|---|---|
| 4,064,372 | 12/1977 | Altenburger | 379/234 X |
| 4,086,438 | 4/1978 | Kahn et al. | 379/201 X |
| 4,796,290 | 1/1989 | Perry | 379/234 X |
| 4,825,463 | 4/1989 | Miura | 379/216 X |
| 5,249,222 | 9/1993 | Pinard | 379/229 X |

FOREIGN PATENT DOCUMENTS

| 2 274 758 | 8/1994 | United Kingdom | H04M 3/42 |
|---|---|---|---|

*Primary Examiner*—Harry S. Hong
*Attorney, Agent, or Firm*—Pascal & Associates

[57] ABSTRACT

A method of operating a communication switching system in conjunction with a PBX comprising: storing at the PBX equipment station identifiers in association with directory numbers, storing at the switching system the station identifiers in conjunction with the directory numbers and a PBX identifier, in the event of a station connected to the PBX going offhook, looking up at the PBX a station identifier associated with a directory number assigned to the offhook station, transmitting the looked up station identifier to the switching system, and upon receiving the transmitted station identifier at the switching system, looking up the corresponding directory number, and changing characteristics of a line between the switching system and the PBX over which communication is to take place, to suit predetermined characteristics based on the corresponding directory number.

11 Claims, 5 Drawing Sheets

DIRECTORY NUMBER SERVICE ASSIGNMENT 37

| DIRECTORY NUMBER | EQUIPMENT NUMBER | SERVICE TYPE | REGISTRATION ID | PBX GROUP |
|---|---|---|---|---|
| 5110101 | | CENTREX USER | 01 | — |
| 5110102 | | CENTREX USER | 02 | — |
| 5110103 | | CENTREX USER | 03 | — |
| 5110104 | | CENTREX USER | 04 | — |
| ... | | ... | ... | ... |
| 511010n | | CENTREX USER | 0n | — |
| 5920101 | 1111 | NORMAL USER | | |
| 5920102 | 1112 | NORMAL USER | | |
| ... | ... | | | |
| 592010m | 111m | NORMAL USER | | |

FIG. 3

METHOD OF PROVIDING CENTREX TYPE OPERATION USING A PBX AND A CENTRAL SWITCHING OFFICE

FIELD OF THE INVENTION

This invention relates to communication systems and in particular to a method of communicating between a switching system and a PBX.

BACKGROUND TO THE INVENTION

Central switching systems (referred to below generally as switching systems) typically have trunks connected to them as paths to communicate with other switching systems, telephone lines to communicate with station sets, and central office trunks or lines to communicate with PBXs. The switching systems typically operate to interconnect telephone lines with each other or with trunks to other switching systems or PBXs. The switching systems can, however, operate to provide a service such as Centrextm, whereby the systems provide services to a group of telephone lines as if a PBX were interfacing the group of telephone lines and the switching system (e.g. to provide specialized user services such as speed dialing, etc.)

Where a typical PBX is used, a user must dial the directory number of a called party, and the PBX analyzes either the complete dialed number or the first digit or few digits, then assuming that the call is destined to be completed to a line outside the PBX, seizes an appropriate central office trunk to the switching system. Then, typically using dual tone multifrequency (dtmf) signals, the PBX sends the dialed digits to the switching system. The switching system then completes the call in the usual way as if the call had come from a local line.

The PBX-switching system combination provides a concentration function, wherein the number of trunks interconnecting the two is significantly smaller than the number of calls originating at the PBX (since many of the calls originating at the PBX are destined for completion at the PBX without requiring the switching system). On the other hand, if the switching system is to provide a Centrex function, the number of lines terminating at the switching system must be the same as the number of lines that could require service (otherwise Centrex service could not be provided to all lines).

Where a PBX is used, the amount of time required to communicate dialed digits to a switching system is either excessive, or requires use of extra data lines in addition to the central office trunks. Further, the central switching system in this case cannot be used to provide a Centrex function, since it has no knowledge of which line connected to the PBX requires specialized services.

Some PBXs can communicate with a central switching system and which allow the central switching system to provide Centrex type service, but they suffer from the same deficiencies as noted above.

SUMMARY OF THE INVENTION

The present invention is a method to enable a central switching system to efficiently and inexpensively provide Centrex services to subscribers connected to a PBX.

In accordance with an embodiment of the invention, a method of operating a communication switching system in conjunction with a PBX is comprised of (a) storing at the PBX equipment station identifiers in association with directory numbers, (b) storing at the switching system the station identifiers in conjunction with the directory numbers and a PBX identifier, (c) in the event of a station connected to the PBX going offhook, looking up at the PBX a station identifier associated with a directory number assigned to the offhook station, (d) transmitting the looked up station identifier to the switching system, and (e) upon receiving the transmitted station identifier at the switching system, looking up the corresponding directory number, and changing characteristics of a line between the switching system and the PBX over which communication is to take place, to suit predetermined characteristics based on the corresponding directory number.

In accordance with another embodiment, a method of operating a communication switching system in conjunction with a PBX is comprised of (a) storing at the PBX equipment station identifiers in association with directory numbers, (b) storing at the switching system the station identifiers in conjunction with the directory numbers and a PBX identifier, (c) in the event of a station connected to the PBX going offhook, looking up at the PBX a station identifier associated with a directory number assigned to the offhook station, (d) transmitting the looked up station identifier to the switching system, and (e) upon receiving the transmitted station identifier at the switching system, transmitting dial tone from the switching system to the offhook station via the line and the PBX.

BRIEF INTRODUCTION TO THE DRAWINGS

A better understanding of the invention will be obtained by considering the detailed description below, with reference to the following drawings, in which:

FIG. 3 is a diagram of a database used in an embodiment of the invention.

DETAILED DESCRIPTION OF EMBODIMENTS OF THE INVENTION

Figure 1:
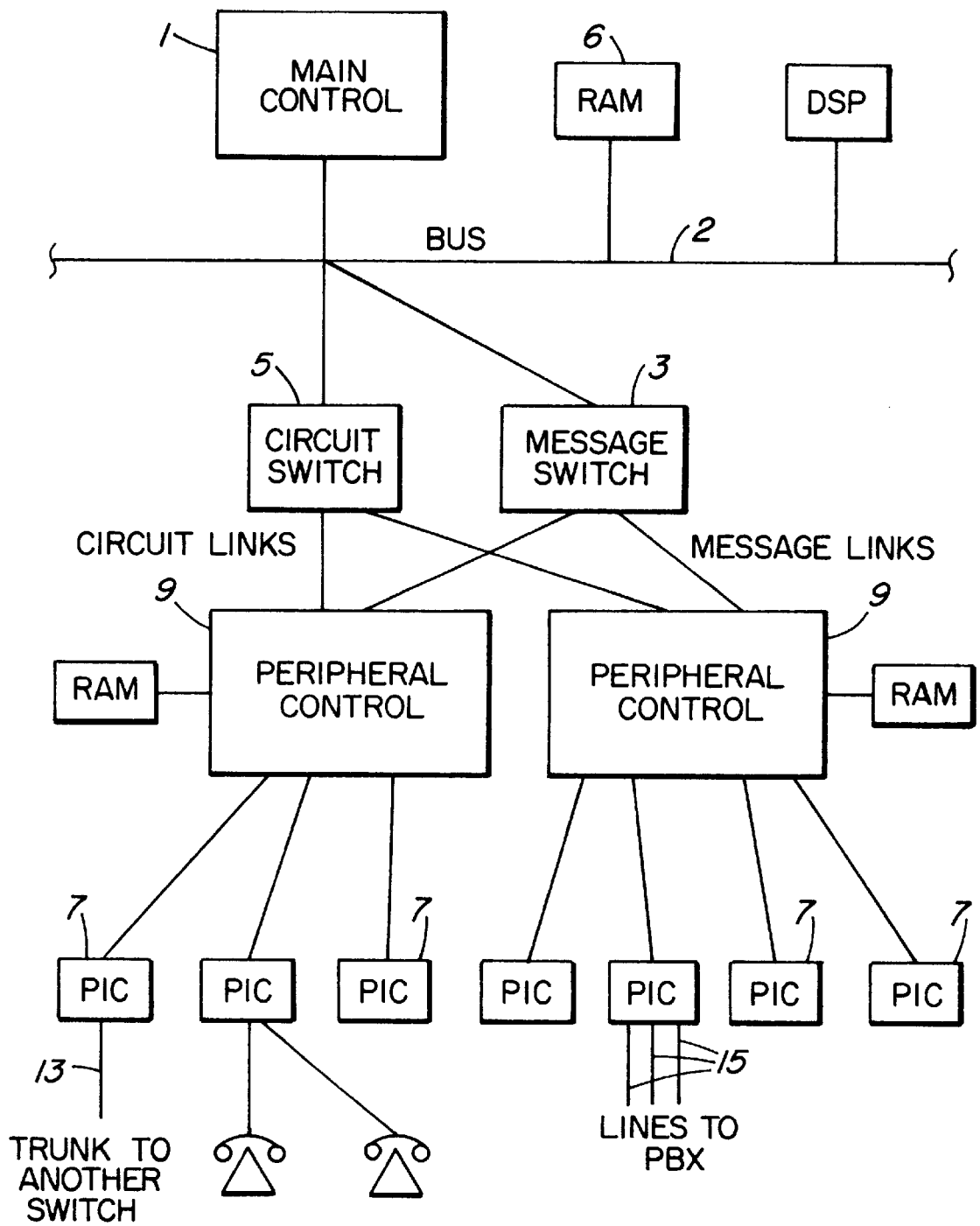
FIG. 1 is a block diagram of a central switching system.

A central switching system on which part of this invention can be implemented is described in U.S. Pat. Nos. 4,510,597 issued Apr. 9, 1985, 4,615,028 issued Sep. 30, 1986 and 4,685,102 issued Aug. 4, 1987, which are incorporated herein by reference. FIG. 1 illustrates the basic architecture of such a system, in which a main control 1 communicates via a bus 2 with subsystem (peripherals) using messages routed via a message switch 3, and controls a circuit switch 5 which makes channel connections. Programs and data relating to operation of the system are stored in memory 6. Signals pass via channels from peripherals such as peripheral interface circuits 7, via peripheral control circuits 9, to the circuit switch 5, the peripheral control circuits 9 being controlled by signals passing via the message switch 3. The signals are routed from and to telephone sets 11 and trunks 13. Signals are also routed from and to trunks 15, which are connected to a PBX.

Figure 2:
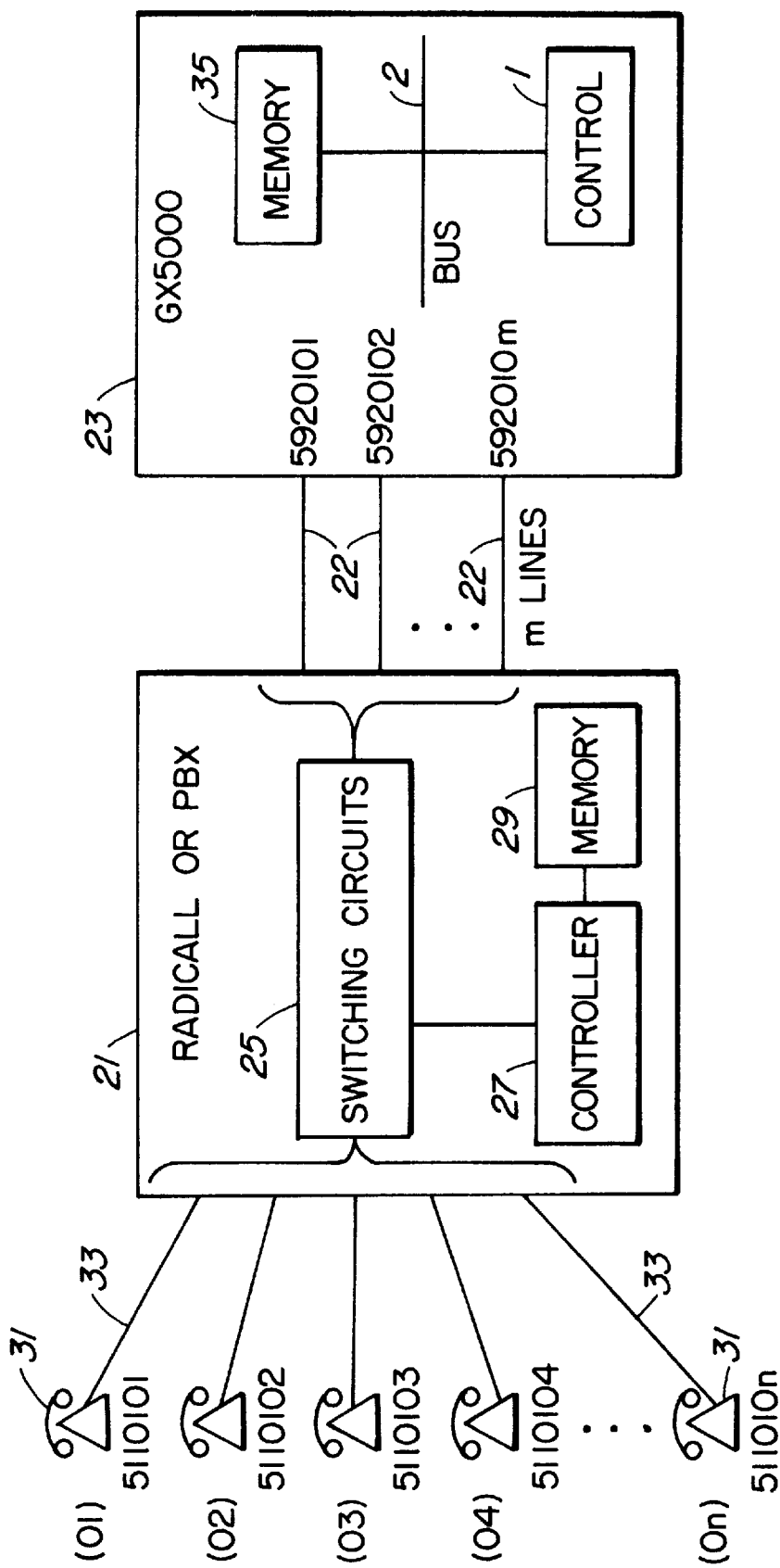
FIG. 2 is a block diagram of a system on which the invention can be carried out.

FIG. 2 illustrates a block diagram of a structure which can be used to implement the present invention. A PBX 21 is connected via m lines 22 to a central switching system 23 which can be of the type described above. The PBX can be of the type sold by Mitel Corporation under the name SX-2000, and can incorporate similar architecture as described in the aforenoted patents.

The PBX has several common elements which are shown in this figure, i.e. switching circuits 25, a controller 27 for the switching circuits, and a memory 29 which stores operation programs for the PBX, and is accessible by the controller 27.

A shown in FIG. 2, a plurality of telephone sets 31 are connected via lines 33 to the PBX. Each of the sets is associated with a directory number, shown as 5110101, 5110102 . . . 511010n. The number of telephone sets n will typically not correspond to the number of lines 22, since the PBX performs a concentration function.

In accordance with an aspect of an embodiment of the invention, memory 29 stores an identification of each telephone set 31 (e.g. shown as 01, 02. . . n) in association with the directory number.

In the central switching system 23, a memory 35 is connected to the bus 2, for access by the control 1. The memory 35 contains a directory number service assignment database 37, such as is shown in FIG. 3, which in the normal case would store an association of directory numbers e.g. 5920101, 5920102 . . . 592010m with equipment numbers, e.g. 1111, 1112 . . . 111m. Thus, to provide normal operation with the PBX, this database service assignment would be used. For example, for an incoming call to the PBX which has a group of trunks all of which have equivalence to the directory number 5920101, a first idle equipment number, e.g. 1111 would be selected to route the incoming call to the PBX. A second call would be routed to the PBX via equipment number 1112, etc.

However, in accordance with the present invention, new fields are added to the same database (or, if desired, a newly created database could be used), which indicates a new Service Type, e.g. Centrex user. For normal PBX operation, the Service Type can be specified as Normal User.

In the Directory Number field of the service assignment database, the directory number of the user is entered, as distinct from the PBX numbers, which equivalent PBX numbers were used for normal calls to and from normal users.

A new Registration ID field is added to database 27, in which the identification number of the equipment at the PBX (e.g. 01, 02. . . n) is entered, in association with the directory number of the user at the PBX (e.g. 5110101, 5110102 . . . 511010n).

A further field is added to database 27, which lists the PBX identity (e.g. "1") to which the directory numbers of the subscribers and of the PBX equivalent numbers and the registration number belong.

It will be recognized that with concentration of lines between the PBX and central switching system, it was previously not possible for the central switching system to provide Centrex service to individual lines connected to the PBX, and a one-to one correspondence between the number of lines connected between the PBX and the sets, and the number of sets, was required if Centrex services were to be provided by the central switching system.

Figure 4:
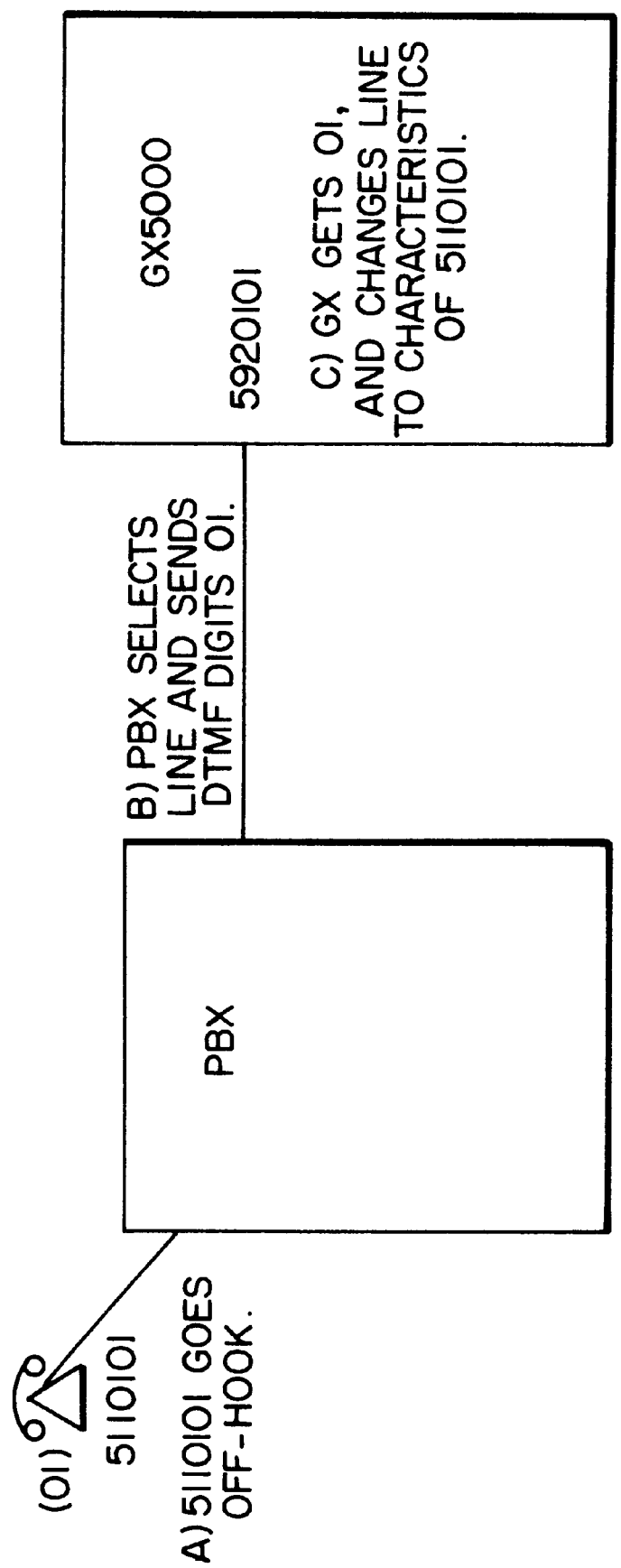
FIG. 4 is a block diagram illustrating operation of an embodiment of the invention.

In accordance with an embodiment of the present invention, when a set originates a call, and it goes offhook, the identity of the line is detected by the PBX in the normal manner. Because the system is to provide Centrex service, all calls between lines and trunks is to be performed by the central switching system. The PBX thus selects and seizes an idle line 22 to the central switching system 20 (see FIGS. 2 and 4). The PBX, having identified the subscriber line which went offhook, thus has the identity of the line (i.e. 01, 02. . . n).

With a line seized to the central switching system, the central switching system attaches a dtmf receiver to the line. The PBX then sends, using dtmf via the seized line, the identity of the line which has gone offhook (e.g. 03). Upon receiving the identity of the line, the central switching system 23 looks up in its database 37 the identity of the directory number (e.g. 5110103).

Also stored at the central switching system is a database of user telephone profiles. This database corresponds directory numbers with services to which the user of the directory number is entitled, e.g. speed dialing, call transfer, specialized ringing, etc. The central switching system, upon receiving the directory number of the user which is using the equipment that has been identified as having gone offhook, looks up the user telephone profile database to determine the services to which the user is entitled.

The central switching system then modifies the line which has carried the data identifying the line connected to the subscriber line that is now in the offhook condition in accordance with the user profile. For example, one profile feature could be bandwidth of the line. The central switching system in this case would attach special filters, transmitters and/or receivers to the line to modify its signal carrying characteristics. The central switching system can invoke use of a personal speed dial database, enable call transfer, etc. or even transfer the call to another line connected between the PBX and central switching system having special characteristics. All of such variation in response and control of a call should be construed in this specification to mean modification or changing the characteristics of a line.

Once the line has been modified in accordance with the user profile identified by the central switching system, the user dials the digits for the originating call, the dialed digits are transmitted via the PBX to the central switching system, and the central switching system completes the call in accordance with the dialed digits in its normal manner, and in accordance with the features stored in the user profile for that directory number.

The central switching system has thus provided a Centrex type service to users connected to the PBX, while also providing line concentration to the PBX, saving considerable line cost. At the same time, calls which use the basic PBX numbers, e.g. 5920101 etc., are processed by the central switching system in the normal manner that calls are processed to the PBX.

Figure 5:
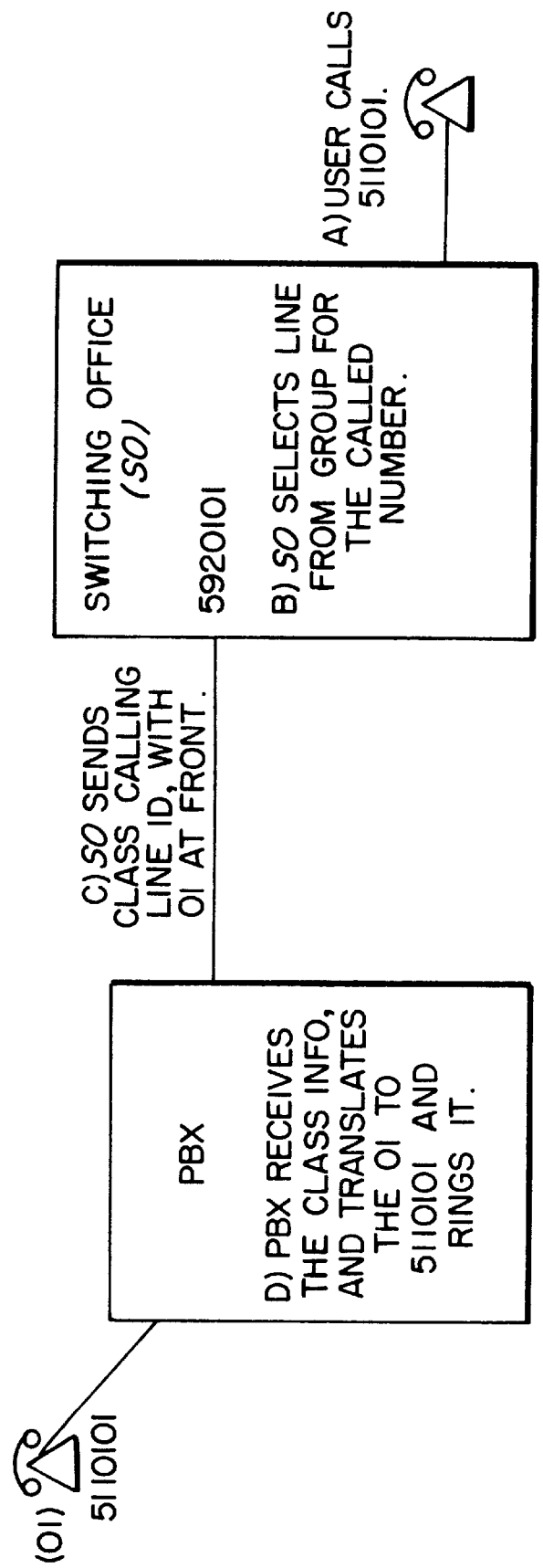
FIG. 5 is a block diagram illustrating operation of an embodiment of the invention.

With reference to FIGS. 2, 3 and 5, for an incoming call, the central switching system looks up the directory number dialed in database 37, and determines that the call is to PBX No."1" in the PBX Group field, and determines from the Service Type field that the call is a normal PBX call. The dialed PBX number, e.g. 5920101 identifies the PBX equivalent line to be used, and the central switching system seizes a line 22 to the designated PBX and processes the call as if it were to a normal PBX.

If the number is to a directory number, e.g. 5010102, it looks up the directory number in the Directory Number field in database 37, determines from the PBX Group field that the call is to a set in PBX group "1", that the call is a Centrex type call, and that the equipment registration identity is "02". The central switching system also looks up the user service profile database and determines either the profile characteristics or an equivalent service class.

The central switching system then seizes a line to the PBX and transmits, preferably using dtmf, the equipment identity (e.g. "02") to the PBX, followed by the service class or signals identifying profile services that can be handled by the PBX.

Since the equipment identity corresponds to the line where the user has logged in his directory number, the PBX looks up the class or profile services identified, rings the line identified by the equipment identity received from the central switching system and operates the line using the identified class characteristics or profile services identified (e.g. ringing cadence, registered transfer of the call to a different line, do not disturb, etc.)

It should be recognized that the present invention does not restrict the user's directory number at the PBX (e.g. 5110101, 5110102 . . . 511010n) to be associated with a particular subscriber line. Users can register the association of their directory numbers with particular sets (and thus with particular lines to which the sets are connected, or particular line circuits to which wireless sets may be associated) by dialing a registration code, e.g. *55 followed by their particular directory number. The PBX recognizes the subscriber line or line circuit used by noting which line or line circuit went offhook, recognizes the *55 number as a command to store the directory number to follow in association with the line that is in use, and stores the directory number in association with the identity of the line in use in a database in the PBX.

It is thus important in accordance with an embodiment of the invention that the user service profile should be stored in association with the directory numbers of the users, rather than in association with the equipment (line or line circuit) identity, since the correct user service profile will be used for the correct user of the set at the PBX. This allows the user service profile to be portable to any of the sets 31, and indeed, could be used if the user moves to another set connected to the central switching system bypassing the PBX.

Further, when a user logs into different equipment, the new association of equipment number and directory number should be automatically and promptly uploaded to the central switching system to make sure that its service assignment database 37 is correct.

A person understanding this invention may now conceive of alternative structures and embodiments or variations of the above. All those which fall within the scope of the claims appended hereto are considered to be part of the present invention.

I claim:

1. A method of operating a communication switching system in conjunction with a PBX comprising:
   (a) storing at the PBX equipment station identifiers in association with directory numbers,
   (b) storing at the switching system said station identifiers in conjunction with said directory numbers and a PBX identifier,
   (c) in the event of a station connected to the PBX going offhook, looking up at the PBX a station identifier associated with a directory number assigned to the offhook station,
   (d) transmitting the looked up station identifier to the switching system, and
   (e) upon receiving the transmitted station identifier at the switching system, looking up the corresponding directory number, and changing characteristics of a line between the switching system and the PBX over which communication is to take place, to suit predetermined characteristics based on the corresponding directory number.

2. A method as defined in claim 1 including storing at the switching system lists of characteristics associated with directory numbers of stations connected to the PBX, looking up said characteristics upon receipt of said station identifier, and modifying operation of said line in accordance with characteristics associated with said offhook station.

3. A method as defined in claim 2, including, upon receiving the transmitted station identifier at the switching system, transmitting dial tone from the switching system to the offhook station via said line and the PBX.

4. A method as defined in claim 3, including receiving incoming call signals at the switching system corresponding to a directory number, locating a station identifier and an associated PBX identifier corresponding to the received directory number by looking up the stored association at the switching system, looking up said characteristics corresponding to the called directory number, seizing a line to the identified PBX and modifying the seized line in accordance with said characteristics, transmitting the station identifier to the PBX, and ringing a line connected to the PBX corresponding to the dialed directory number.

5. A method as defined in claim 4 including the further step of looking up a line identity corresponding to the called directory number at the PBX prior to ringing said line.

6. A method as defined in claim 5 including looking up a database and modifying operation of said line in accordance with a user profile stored in association with the dialed directory number.

7. A method as defined in claim 6 in which the database is stored at the PBX.

8. A method as defined in claim 6 in which the database is stored at the switching system, transmitting a class identifier with the station identifier from the switching system to the PBX, which class identifier corresponds to the user profile.

9. A method of operating a communication switching system in conjunction with a PBX comprising:
   (a) storing at the PBX equipment station identifiers in association with directory numbers,
   (b) storing at the switching system said station identifiers in conjunction with said directory numbers and a PBX identifier,
   (c) in the event of a station connected to the PBX going offhook, looking up at the PBX a station identifier associated with a directory number assigned to the offhook station,
   (d) transmitting the looked up station identifier to the switching system, and
   (e) upon receiving the transmitted station identifier at the switching system, transmitting dial tone from the switching system to the offhook station via said line and the PBX.

10. A method as defined in claim 9, and upon receiving the transmitted station identifier at the switching system, looking up the corresponding directory number, and changing characteristics of the line between the switching system and the PBX to suit predetermined characteristics based on the corresponding directory number.

11. A method as defined in claim 10 in which said characteristics are stored in a database in the switching system in association with said directory numbers, and looking up said corresponding directory number in the database to retrieve said characteristics.

* * * * *